(12) United States Patent
Carter et al.

(10) Patent No.: US 10,009,178 B2
(45) Date of Patent: *Jun. 26, 2018

(54) METHODS AND SYSTEMS FOR MANAGING NETWORK ACTIVITY USING BIOMETRICS

(71) Applicant: Eylock LLC, New York, NY (US)

(72) Inventors: Samuel J. Carter, Winston Salem, NC (US); Christopher L. Ream, Fort Collins, CO (US); Sarvesh Makthal, Dobbs Ferry, NY (US); Stephen Charles Gerber, Austin, TX (US)

(73) Assignee: EyeLock LLC, New York, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/352,841

(22) Filed: Nov. 16, 2016

(65) Prior Publication Data

US 2017/0078097 A1 Mar. 16, 2017

Related U.S. Application Data

(63) Continuation of application No. 15/067,696, filed on Mar. 11, 2016, now Pat. No. 9,509,690.

(Continued)

(51) Int. Cl.
*H04L 9/32* (2006.01)
*H04L 9/08* (2006.01)
(Continued)

(52) U.S. Cl.
CPC .......... *H04L 9/3231* (2013.01); *H04L 9/0816* (2013.01); *H04L 9/30* (2013.01);
(Continued)

(58) Field of Classification Search
CPC ....... H04L 9/3231; H04L 9/30; H04L 9/0816; H04L 9/3013; H04L 9/3066; H04L 9/3033; H04L 63/0861
See application file for complete search history.

(56) References Cited

U.S. PATENT DOCUMENTS 4,641,349 A 2/1987 Flom et al.
5,259,040 A 11/1993 Hanna
(Continued)

FOREIGN PATENT DOCUMENTS

WO WO-2010/062371 6/2010
WO WO-2011/093538 8/2011

OTHER PUBLICATIONS

International Preliminary Report on Patentability on PCT/US2016/022084 dated Sep. 12, 2017.

(Continued)

*Primary Examiner* — Darren B Schwartz
(74) *Attorney, Agent, or Firm* — Foley & Lardner LLP

(57) ABSTRACT

The present disclosure describes systems and methods for managing network traffic using biometrics. A server may store a first value N, a primitive root modulo N, and a plurality of verification codes generated using the primitive root modulo N to the power of a hash function result of a respective portion of a first biometric template acquired from the user during enrollment. The sever may receive a request to connect to the server, from a client operated by the user. The client may use a first offset identifier from the server to identify a first portion of a second biometric template acquired from the user, and generate a first value corresponding to a common exponentiation function. The server may generate a second value corresponding to the common exponentiation function. The server may determine that the user is authenticated if the first value from the client matches the second value.

20 Claims, 9 Drawing Sheets

Related U.S. Application Data

(60) Provisional application No. 62/132,086, filed on Mar. 12, 2015, provisional application No. 62/237,121, filed on Oct. 5, 2015.

(51) Int. Cl.
*H04L 9/30* (2006.01)
*H04L 29/06* (2006.01)

(52) U.S. Cl.
CPC .......... *H04L 9/3013* (2013.01); *H04L 9/3033* (2013.01); *H04L 9/3066* (2013.01); *H04L 63/0861* (2013.01)

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,038,315 A | 3/2000 | Strait et al. |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,317,834 B1 | 11/2001 | Gennaro et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,539,479 B1 | 3/2003 | Wu |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,853,794 B2 | 12/2010 | Jeffries et al. |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 8,464,058 B1 | 6/2013 | Chen et al. |
| 2004/0148509 A1 | 7/2004 | Wu |
| 2004/0172535 A1 | 9/2004 | Jakobsson et al. |
| 2005/0084137 A1 | 4/2005 | Kim et al. |
| 2005/0132192 A1 | 6/2005 | Jeffries et al. |
| 2006/0074986 A1 | 4/2006 | Mallalieu et al. |
| 2007/0211922 A1 | 9/2007 | Crowley et al. |
| 2007/0253608 A1 | 11/2007 | Tulyakov et al. |
| 2007/0288998 A1 | 12/2007 | Gudigara et al. |
| 2008/0037833 A1 | 2/2008 | Takahashi et al. |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2009/0310830 A1 | 12/2009 | Bolle et al. |
| 2010/0021016 A1 | 1/2010 | Cottard et al. |
| 2010/0074477 A1 | 3/2010 | Fujii et al. |
| 2010/0127826 A1 | 5/2010 | Saliba et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0099385 A1 | 4/2011 | Takahashi |
| 2011/0158486 A1 | 6/2011 | Bringer et al. |
| 2011/0194738 A1 | 8/2011 | Choi et al. |
| 2011/0268270 A1 | 11/2011 | Vanstone et al. |
| 2011/0277518 A1 | 11/2011 | Lais et al. |
| 2012/0082312 A1 | 4/2012 | Liu et al. |
| 2012/0239940 A1 | 9/2012 | Chabanne et al. |
| 2012/0240223 A1 | 9/2012 | Tu |
| 2012/0257797 A1 | 10/2012 | Leyvand et al. |
| 2013/0086075 A1 | 4/2013 | Scott et al. |
| 2013/0326235 A1 | 12/2013 | Meister |
| 2015/0012742 A1 | 1/2015 | Gorelik et al. |

OTHER PUBLICATIONS

B. Galvin, et al., Recovering Motion Fields: An Evaluation of Eight Optical Flow Algorithms, Proc. of the British Machine Vision Conf. (1998).

International Search Report & Written Opinion on PCT/US2016/022084 dated Jun. 17, 2016 (EYE-025PC).

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

Notice of Allowance on U.S. Appl. No. 15/067,696 dated Jul. 15, 2016 (EYE-035US).

R. Kumar, et al., Direct recovery of shape from multiple views: a parallax based approach, 12th IAPR Int'l Conf. on Pattern Recognition (1994).

METHODS AND SYSTEMS FOR MANAGING NETWORK ACTIVITY USING BIOMETRICS

RELATED APPLICATIONS

This application is a continuation of and claims priority to U.S. patent application Ser. No. 15/067,696, filed Mar. 11, 2016, which in turn claims priority to and the benefit of U.S. Provisional patent Application No. 62/132,086, filed Mar. 12, 2015, and claims priority to and the benefit of U.S. Provisional Patent application No. 62/237,121, filed Oct. 5, 2015. The entire contents of the foregoing applications are hereby incorporated herein by reference for all purposes.

FIELD OF THE DISCLOSURE

This disclosure generally relates to systems and methods for managing, authenticating, and validating the integrity of network traffic, including but not limited to systems and methods for managing network activity using biometrics.

BACKGROUND OF THE DISCLOSURE

The expansion of enterprise or other networks beyond traditional perimeters through cloud services and mobile devices, coupled with the explosive growth in internet connected devices or Internet of Things (IOT), is putting a premium on the ability to understand large volumes of data from network activity. There is a growing awareness that sophisticated attacks, have succeeded in penetrating critical industries and government agencies. Conventional systems and methods for network security and logical access control are often inadequate for addressing such sophisticated attacks and other malicious activities. Additionally, methods for validating the identity of users generating network traffic are of high importance for secure transactions.

BRIEF SUMMARY OF THE DISCLOSURE

Described herein are systems and methods for managing network activity using biometrics, for example in firewall or virtual local area network (VLAN) applications. The present systems and methods may be deployed to monitor network traffic (e.g., continuously or in a controlled fashion). For example and in some embodiments, network messages may be tagged or authenticated with information that involves or relates to the use of biometrics or a biometric marker. In certain embodiments, the information may be decoded, processed or accessed using biometrics or a biometric marker, or the information may include elements that can be matched or verified without the direct use of biometric matching.

In some embodiments, the present systems and methods are deployed to restrict network traffic (e.g., continuously or in a controlled fashion) to that which is human originated and/or authenticated. The present systems and methods can for example limit or mitigate the risk of the spread of malware on a network, limit or zone the dissemination or availability of information assets, and/or confer or data ascertain provenance and rights to any asset or resource that is digital or otherwise. In certain embodiments, the present systems and methods provide or enable non-repudiation of a user's identity and/or actions using strong biometric markers aligned to certified identity sources and/or blockchain auditing for example. In some embodiments, the present systems and methods enable a person's own set of firewall policies to follow the person, regardless of the device and/or network the person is using or has moved to.

In one aspect, the present disclosure is directed to a method of managing network traffic using biometrics. The method may include storing, by a server, a first value N, and a primitive root modulo N, wherein N is selected during enrollment of a user. The server may be configured to store a plurality of verification codes. Each of the plurality of verification codes may be generated using the primitive root modulo N to the power of a hash function result of a respective portion of a first biometric template acquired from the user during the enrollment. Each portion of the biometric template may be identified by a corresponding offset identifier. The sever may receive a request to connect to the server, from a client operated by the user. The server may transmit a first offset identifier to the client. The client may use the first offset identifier to identify a first portion of a second biometric template acquired from the user in association with the request, and to generate a first value corresponding to a common exponentiation function using the identified first portion of the second biometric template. The common exponentiation function may have the primitive root modulo N as a base. The server may generate, according to the first offset identifier, a second value corresponding to the common exponentiation function. The server may determine that the user is authenticated if the first value from the client matches the second value.

In some embodiments, the first value N comprises one of a prime number, a discrete logarithm element, or an elliptic curve element. Each of the plurality of verification codes may be generated using the primitive root modulo N to the power of a hash function result of a respective value, the respective value generated using a random number and a respective portion of the first biometric template acquired from the user during the enrollment. In certain embodiments, the random number comprises one of: a random number separate from random numbers used to generate other respective values, or comprises a common random number used to generate other respective values.

In certain embodiments, the server receives an identifier of the user in the request, and may retrieve a first portion of the biometric template stored by the server according to the identifier of the user and the first offset identifier. The server may generate a random number z and may compute a public key for the server comprising the sum of: the primitive root modulo N to the power of z, and a first verification code from the plurality of verification codes that corresponds to the first offset identifier. The server may send the public key for the server to the client for use in generating the first value corresponding to the common exponentiation function. The server may generate a random parameter, and may send the random parameter to the client for use in generating the first value corresponding to the common exponentiation function. The client may generate a long term private key for the client using the first offset identifier. The client may use a random number y to generate a short term public key for the client, the short term public key comprising the primitive root modulo N to the power of y.

In another aspect, the disclosure is directed to a system of managing network traffic using biometrics. The system may include a server in communication with a client operated by a user. The server may include memory configured to store a first value N, and a primitive root modulo N, wherein N is selected during enrollment of the user, and to store a plurality of verification codes. Each of the plurality of verification codes may be generated using the primitive root modulo N to the power of a hash function result of a respective portion of a first biometric template acquired from the user during the enrollment. Each portion of the biometric template may be identified by a corresponding offset identifier.

The system may include a transceiver configured to receive a request from the client to connect to the server, and to transmit a first offset identifier to the client. The client may use the first offset identifier to identify a first portion of a second biometric template acquired from the user in association with the request, and/or to generate a first value corresponding to a common exponentiation function using the identified first portion of the second biometric template. The common exponentiation function may have the primitive root modulo N as a base.

The system may include one or more processors configured to generate, according to the first offset identifier, a second value corresponding to the common exponentiation function. The one or more processors may be configured to determine that the user is authenticated if the first value from the client matches the second value.

In some embodiments, the first value N comprises one of a prime number, a discrete logarithm element, or an elliptic curve element. Each of the plurality of verification codes may be generated using the primitive root modulo N to the power of a hash function result of a respective value. The respective value may be generated using a random number and a respective portion of the first biometric template acquired from the user during the enrollment. The random number may comprise one of: a random number separate from random numbers used to generate other respective values, or comprises a common random number used to generate other respective values.

The transceiver may be further configured to receive an identifier of the user in the request, and the one or more processors may be further configured to retrieve a first portion of the biometric template stored by the server according to the identifier of the user and the first offset identifier. The one or more processors may be further configured to generate a random number z and to compute a public key for the server as comprising the sum of: the primitive root modulo N to the power of z, and a first verification code from the plurality of verification codes that corresponds to the first offset identifier. The transceiver may be further configured to send the public key for the server to the client for use in generating the first value corresponding to the common exponentiation function. The one or more processors may be further configured to generate a random parameter, and the transceiver may be further configured to send the random parameter to the client for use in generating the first value corresponding to the common exponentiation function.

In some embodiments, the client generates a long term private key for the client using the first offset identifier. The client may use a random number y to generate a short term public key for the client, the short term public key comprising the primitive root modulo N to the power of y.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
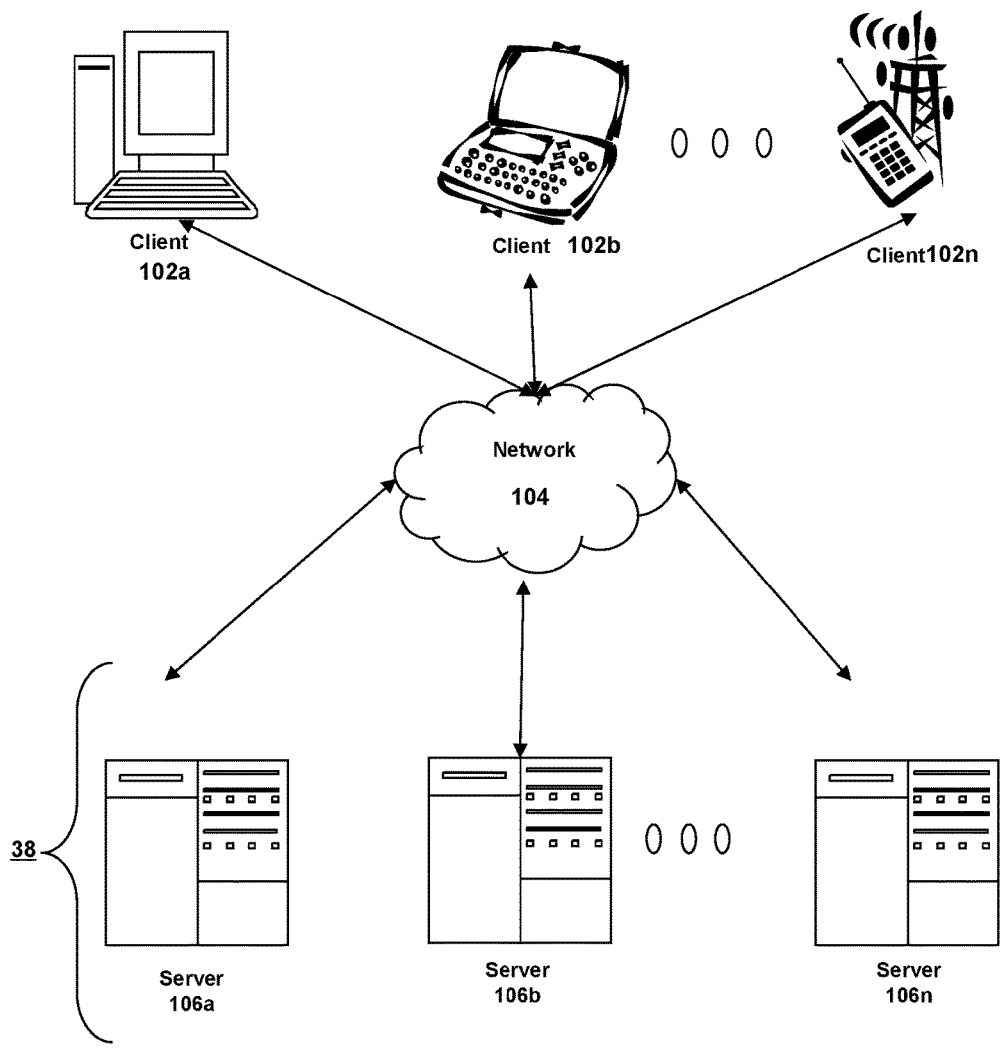
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for managing network activity using biometrics.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 106b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
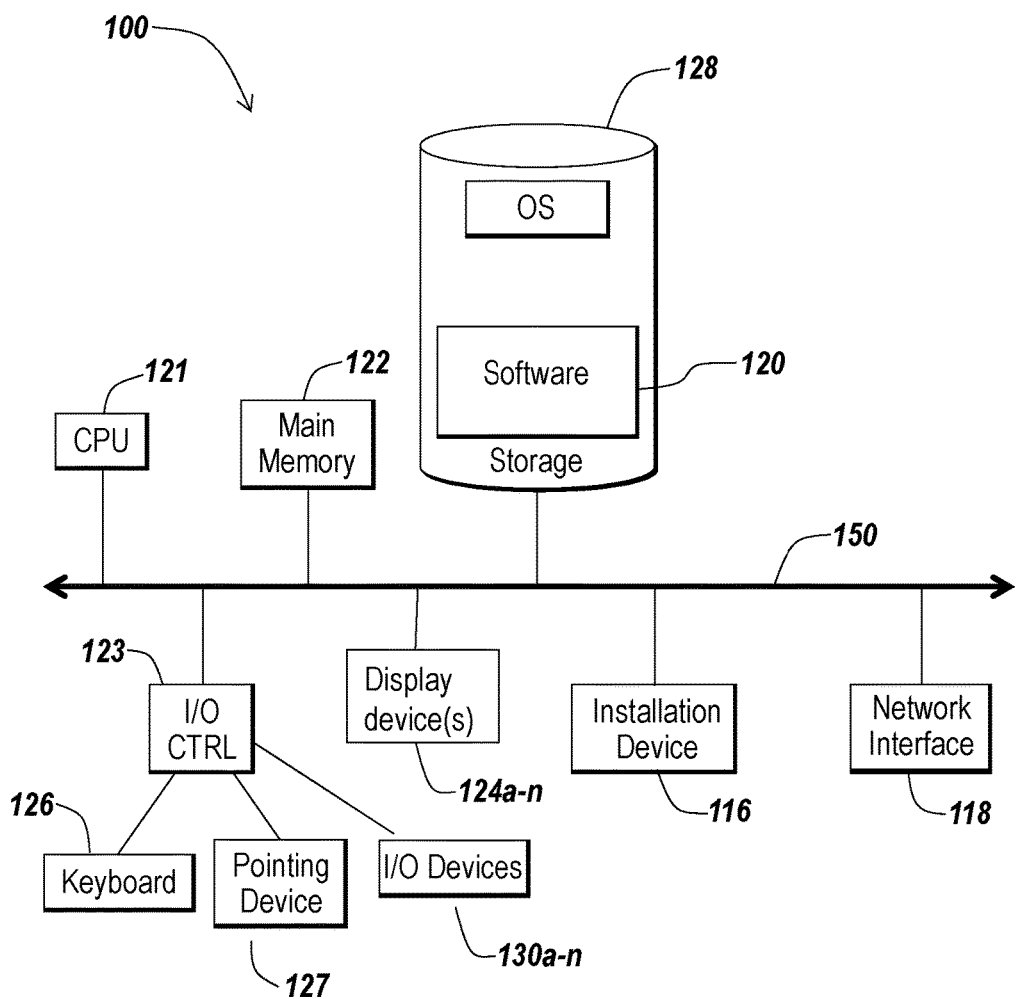
FIGS. 1B and 1C are block diagrams depicting embodiments of computing devices useful in connection with the methods and systems described herein.
Figure 1C:
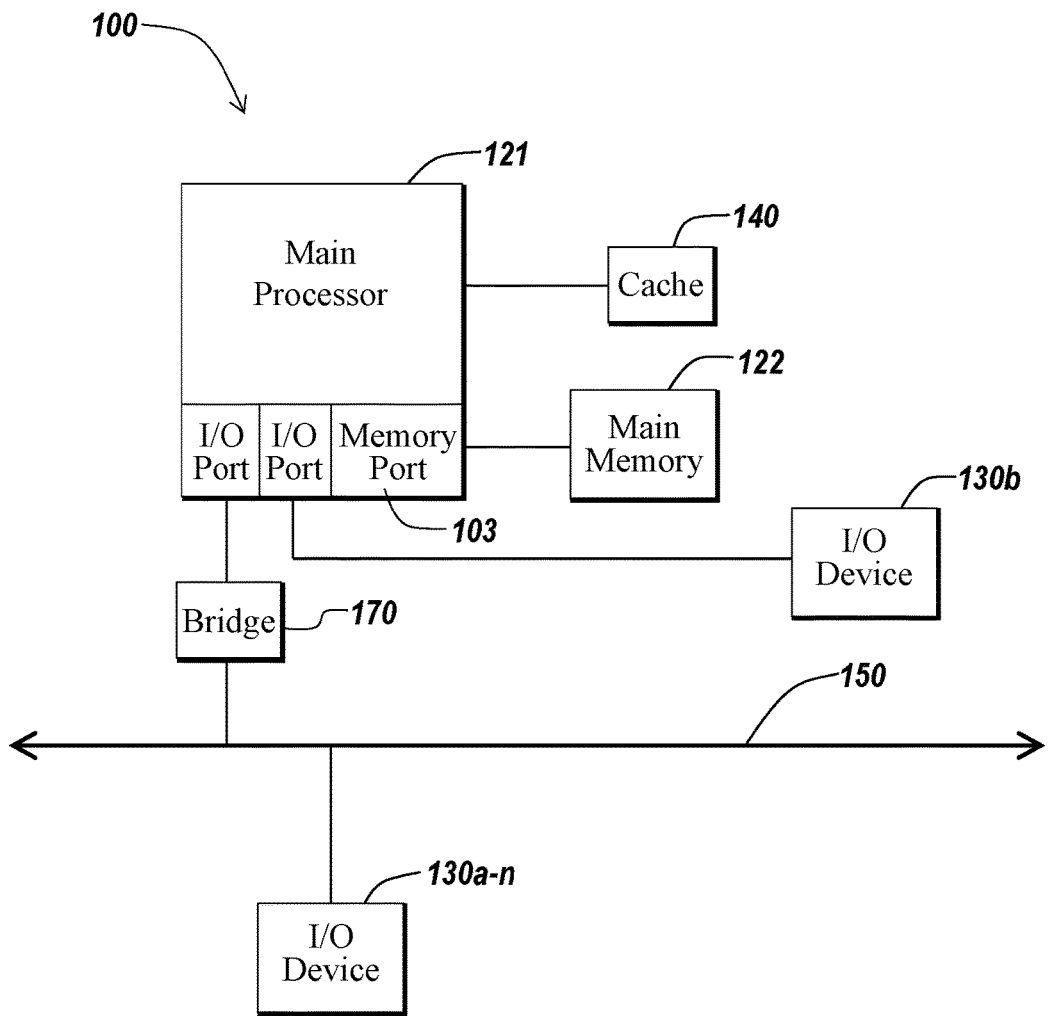

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 player. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Managing Network Activity Using Biometrics

Described herein are systems and methods for managing network activity using biometrics. Embodiments of the systems and methods may use biometric authentication, liveness detection and/or artificial intelligence based behavioral analysis to ensure that the source of network traffic originating from a user device comprises a human source and the traffic is not machine or software generated. By asserting the origin of network traffic to be either human-generated or machine/software-generated, a system can for example prevent the spread of malware or other potentially unwanted network traffic, e.g., on a TCP/IP (version 4 or 6) based network. The system can also detect and/or prevent a live "bad actor" from impersonating another user on a network.

By way of non-limiting example, the present systems and methods may be deployed or incorporated in firewall, VLAN, blockchain auditing, TCP/IP filtering, active defense, or data provenance applications. The present systems and methods may be deployed to monitor network traffic (e.g., continuously or in a controlled fashion). For example, and in some embodiments, network or handshake messages may be tagged with information that involves use of biometrics or a biometric marker of a user or person (e.g., in a challenge-response verification process). In certain embodiments, the information may be encoded/hashed using the biometrics or biometric marker.

In some embodiments, the present systems and methods are deployed to restrict network traffic (e.g., continuously or in a controlled fashion) to that which is human originated and/or authenticated. The present systems and methods can for example limit or mitigate the risk of the spread of malware on a network, limit or zone the dissemination or availability of information assets, and/or confer or data ascertain provenance and rights to any asset or resource that is digital or otherwise. In certain embodiments, the present systems and methods provide or enable non-repudiation of a user's identity and/or actions using strong biometric markers aligned to certified identity sources and/or blockchain auditing for example. In some embodiments, the present systems and methods enable a person's own set of firewall policies to follow the person, regardless of the device and/or network the person is using or has moved to.

In an enterprise environment or in some other organizations for example, network policies can enforce all manners of access privileges. In some embodiments, the organization or enterprise can strictly enforce the principle of least-privilege. For instance, it may not be appropriate for an accounting department to have access to certain (e.g., YouTube) resources during normal work hours. However, it may be appropriate for the Human Resource and/or Training departments to have access to such resources. By leveraging on biometrics, the present systems and methods can provide granular control on a per-user basis without having to weaken the security policy for all users.

In a public access environment, for example involving locations such as airports, restaurants, libraries and hotels, WiFi hotspots or other network access points, embodiments of the present systems and methods can be used to eliminate segregated VLANs or access between authorized personnel and the general public. By controlling or managing network activity using biometric-based attribution of network activity to specific users, the present systems and methods can mix various levels of access for different users on the same medium (WiFi access or physical connection, for instance) or different ones for access to the same network.

Figure 2A:
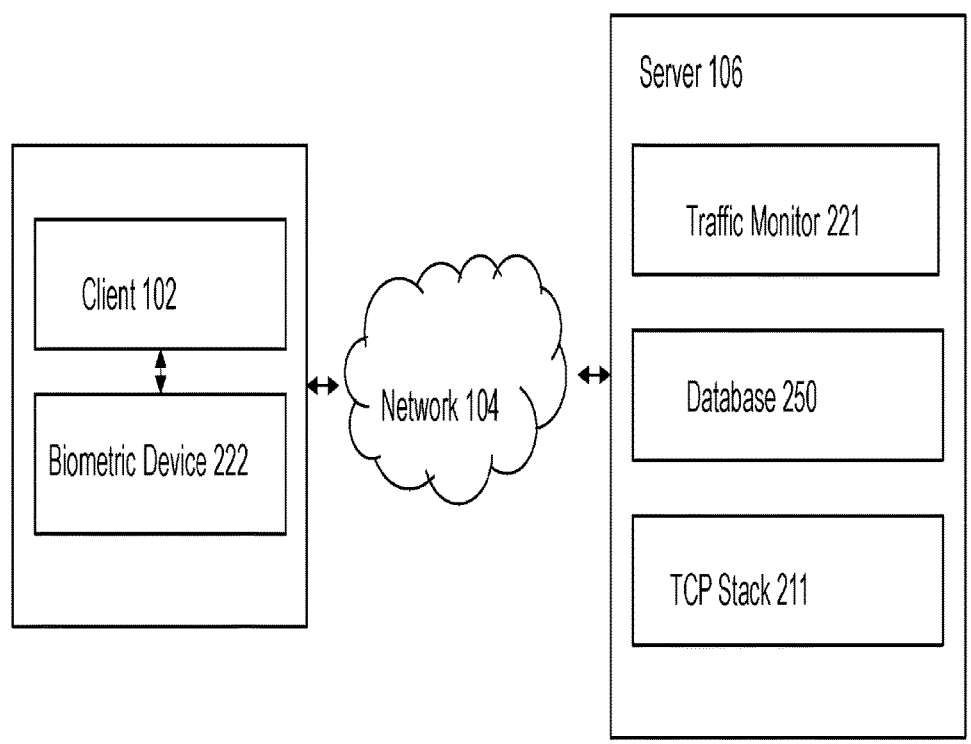
FIG. 2A is a block diagram depicting one embodiment of a system for managing network activity using biometrics.

Referring to FIG. 2A, one embodiment of a system for managing network activity using biometrics is depicted. In brief overview, the system may include one or more subsystems or modules, for example, one or more clients 102 and one or more servers 106. A client 102 may include (or be in communication with) a biometric device 222. A server 106 may comprise a server hosting a network resource or providing/controlling access to a network resource. For instance, the server 106 may host applications, data, remote desktops or other resources that a client 102 may want to access. In some embodiments, the server 106 may comprise a network node or appliance (e.g., that is in communication with, or intermediary between a client 102 and a resource-hosting server), that manages network communications directed between the client 102 and the resource-hosting server. In some embodiments, the server 106 includes one or more modules and/or submodules, for example, one or more of a traffic monitor 106, a database 250, or a TCP stack 211. In certain embodiments, the client includes any one or more of these elements and/or their functions. The client 102 may host or execute one or more agents of these elements.

Each of the elements, modules and/or submodules in the system is implemented in hardware, or a combination of hardware and software. For instance, each of these elements, modules and/or submodules can optionally or potentially include one or more applications, programs, libraries, scripts, tasks, services, processes or any type and form of executable instructions executing on hardware of the client 102 and/or server 106 for example. The hardware may include one or more of circuitry and/or a processor, for example, as described above in connection with at least 1B and 1C. Each of the subsystems or modules may be controlled by, or incorporate a computing device, for example as described above in connection with FIGS. 1A-1C. The system may sometimes be referred to as comprising a Hotzone configuration or platform.

In certain embodiments, the client comprises a device that sends one or more messages to a network 104. The one or more messages may include a request for a network resource, or information or instructions to another network node. The client may be operated by a user or human operator, for example, during a certain period of time. The client be coupled with or include a biometric device 222. The biometric device may comprise a biometric reader or acquisition device. The biometric device may comprise an enrollment, matching, verification and/or identification device for acquiring, validating and/or processing biometric information of the user. The biometric device may be capable of processing one or more types of biometrics, e.g., iris, fingerprint, facial image, palm print, palm veins, voice, heat signature, micro-saccade eye movements, pupil dilation ratios, etc. The biometric device may be capable of processing behavioral biometric markers of a user, such as keystroke-based characteristics (e.g., dwell and flight times), or user-behavior or activities on the web.

In some embodiments, the server includes a memory or database 250. The database may include or store biometric information, e.g., enrolled via the biometric device 222 and/or another device such as the server. The database may include or store information pertaining to a user, such as that of a transaction (e.g., a date, time, value of transaction, type of transaction, frequency of transaction, associated product or service), online activity (e.g., web page information, advertising presented, date, time, etc.), an identifier (e.g., name, account number, contact information), a location (e.g., geographical locations, IP addresses). The server may use the information in the database to verify, cross-check or correlate between network traffic or activities purportedly of the same user. For example, the traffic monitor 221 of the server may monitor and/or analyze network traffic relating to a user to determine, learn and/or associate behavioral or data patterns, and/or to detect potential or suspected anomalies.

In certain embodiments, the server includes a TCP stack 211 for communicating with the client. The client may include a similar or corresponding TCP stack. In some embodiments, for example in a server that supports certain features of the present methods and systems, the TCP stack may comprise a modified TCP stack capable of establishing biometric attribution or provenance to a user. Such a server may sometimes be referred to as BioTagging aware, and the supported features may be referred to as BioTagging.

In some embodiments of the present methods and systems, the BioTagging feature leverages on biometrics and the TCP stack (e.g., of the server and/or client) to provide or enhance network security. The TCP stack 211 can be modified or configured to use TCP/IP and IPV6 for authenticated communications that involves biometrics (e.g., in the TCP handshake). In some embodiments, integration of biometrics into the TCP handshake can ensure that local area network (LAN), Intranet, Internet or other network traffic originates from an intentional action of a user. This can help prevent the spread of malware and other potentially unwanted programs (PUP's) from infecting a network, provide accountability of user actions (e.g., through attribution and non-repudiation), and/or enhance the security of online transactions.

During the course of TCP communications, a TCP header accompanies each TCP packet. By way of illustration, and in some embodiments, the TCP header may include one or more of the following parameters:

1. SOURCE PORT—An established communication port for an origination or source of the TCP packet or traffic
2. DESTINATION PORT—An established communication port for a destination of the TCP packet or traffic.
3. SEQUENCE-NUMBER—A random number generated during TCP handshake (hereafter sometimes referred to as a TCP 3-way handshake), used to track the specific TCP communication or packet, and reorder any packets that may arrive asynchronously.
4. ACKNOWLEDGEMENT-NUMBER—A number derived from the SEQUENCE-NUMBER generated during the TCP 3-way handshake, and may be used by a receiving endpoint to acknowledge receipt of a packet or to indicate that data should be resent.
5. DATA-OFFSET—A number indicating how many bits into the TCP packet the receiving endpoint can expect to find actual packet data.
6. FLAGS—An array of 1-bit flags to indicate various states of a TCP communication stream (e.g., an array of six flags, which may correspond to flags or indicators for Urgent, Acknowledgement, Push, Reset, Synchronize, Finish). These are sometimes referred to as control bits.
7. WINDOW-SIZE—A field used for network optimization to adjust a segment size of TCP communications (e.g., number of window size units).
8. CHECKSUM—A cyclic redundancy check (CRC) checksum of the packet to indicate whether all data was received properly.
9. URGENT-POINTER—may be used in connection with the urgent flag, the URGENT-POINTER indicates an offset of an urgent data.
10. OPTIONS—May be used to indicate various TCP options (e.g., Maximum Segment Size, Selective Acknowledgement, Timestamps, etc.)
11. DATA—TCP transmitted data.

Figure 2B:
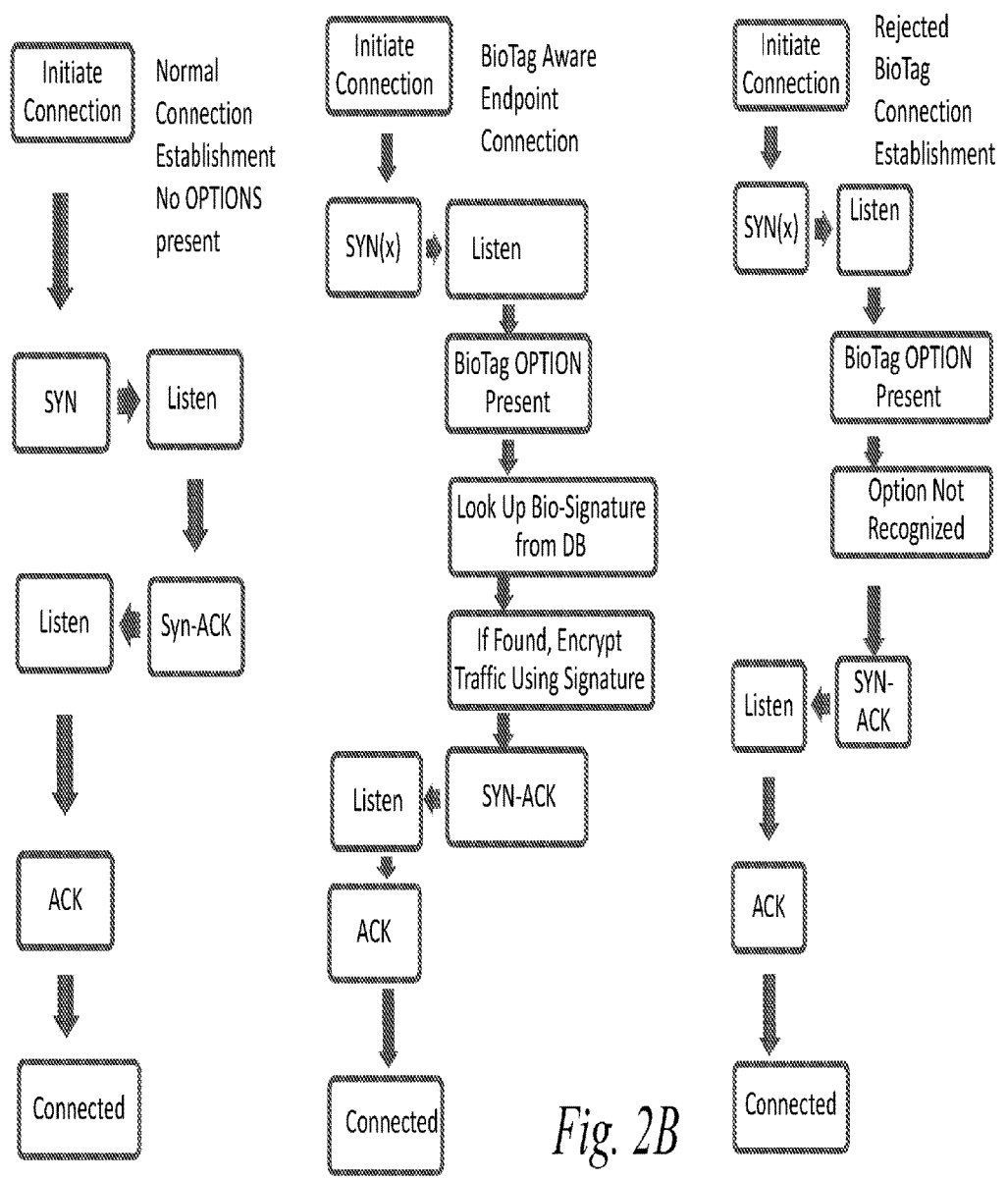
FIG. 2B depicts flow diagrams of embodiments of methods for managing network activity.

The left portion of FIG. 2B depicts one embodiment of the handshake process employed for TCP.

In some embodiments, the present systems and methods implement BioTagging by using some features of a standard TCP header. By way of a non-limiting example, BioTagging may be implemented in some embodiments as follows:

1. SYN—During normal TCP connection establishment using a typical 3-way handshake for example, a sender, which may comprise a server, may indicate that the sender wishes to biometrically authenticate with a client by setting a corresponding OPTIONS field to a specified value (e.g., 79, or any other value). Merely by way of illustration and not intended to be limiting in any way, a server is referred here as the sender and performs the handshake with a client. It is contemplated that any pair of devices of any type(s) may perform the operations described herein.
2. If the server is BioTagging aware, the server may register the OPTIONS field as a request for biometric authentication.
3. In cases where the client is not BioTagging aware, the client would not recognize the OPTIONS field (e.g., which is unknown to the client). The client would simply ignore the unknown or unrecognized OPTIONS field per TCP specifications, for instance. If, however, the client is BioTagging aware, the client can digitally sign (or encode) the client's biometric marker into a DATA field of the corresponding TCP packet for instance (or any other suitable or available field or portion of the TCP packet).
4. The server can then validate that the signed (or encoded) values could only have been generated in the presence of a validated biomarker corresponding to an identity that is known.
5. If one or more of the returned values are not cryptographically validated (e.g., based on the corresponding biomarker or biometrics), the communication can proceed as normal (e.g., unauthenticated) TCP/IP communications wherein the server may choose to reset, reject, ignore, or redirect the TCP connection for instance.

By way of example, the middle and right portions of FIG. 2B depict illustrative embodiments of a method for managing network activity. By way of illustration, these portions describe scenarios that may occur using a modified handshake such as the one discussed above.

In various embodiments, TCP/IP communications across a network and/or the Internet can remain intact and no modification to the current infrastructure may be needed. Hosts (e.g., servers and/or clients) that are not aware of BioTagging can continue to operate normally even when faced with a BioTagging challenge. Hosts that are BioTagging aware can include a modified TCP/IP stack that can accommodate the embedded tag (e.g., a known value and/or hashed nonce). In some aspects, one advantage of this feature is that it can leverage existing TCP features and does not require vendors to upgrade devices that do not need to be BioTagging aware. By intercepting the normal/standard three-way TCP/IP Handshake, embodiments of the present system and methods are able to integrate a challenge/response mechanism that authenticates the user based on biometric markers. The TCP stack is adapted or modified to include or support this challenge/response mechanism. In some embodiments, systems that are not BioTagging aware are not be affected by this change and may not be aware of any difference in the TCP communication and/or handshake.

In some embodiments of the present system implementing BioTagging, the system allows for TCP/IP filtering using biometrics. The system can provide active defense by allowing only human-originated traffic, such as by blocking unattended client traffic or non-human traffic unless exceptions are granted, using liveness verification for example. In some embodiments, the system uses biometrics (e.g., microsaccade movements or reactions) to establish or verify liveness, e.g., that there is a live human present or involved, and generating the network traffic. This allows for non-repudiation in establishing the identity of the user who generated the traffic. The system can provide granular control over network traffic through a per-user model of access, e.g., using the same biometrics or complementary biometrics (e.g., iris patterns or striations).

The granular control may be applied in conjunction with using liveness verification to restrict access to human-only originated traffic. Therefore, the system can apply unique firewall rules to a specific user, triggered by or responsive to a successful authentication by the user. By way of example, and not intended to be limiting in any way, a personal computer may imitate a connection attempt from the personal computer. The system may verify if the user is physically present (e.g., liveness of the person). If the biometric device of the system determines that the user is not present or live, the system may deny the connection attempt. In some embodiments, the system may determine if the connection attempt is on an exceptions list to a liveness requirement. Therefore, an unattended client device can send traffic if an exception is granted or has been granted. Otherwise, traffic from unattended clients may be blocked or denied. In some embodiments, if the biometric device determines that the user is present or live, the system may implement policies based on the user's identity (e.g., established using the user's biometrics). For instance, a policy may check if the connection request is a type of traffic that is allowed, or traffic that is allowed for that user.

Figure 2C:
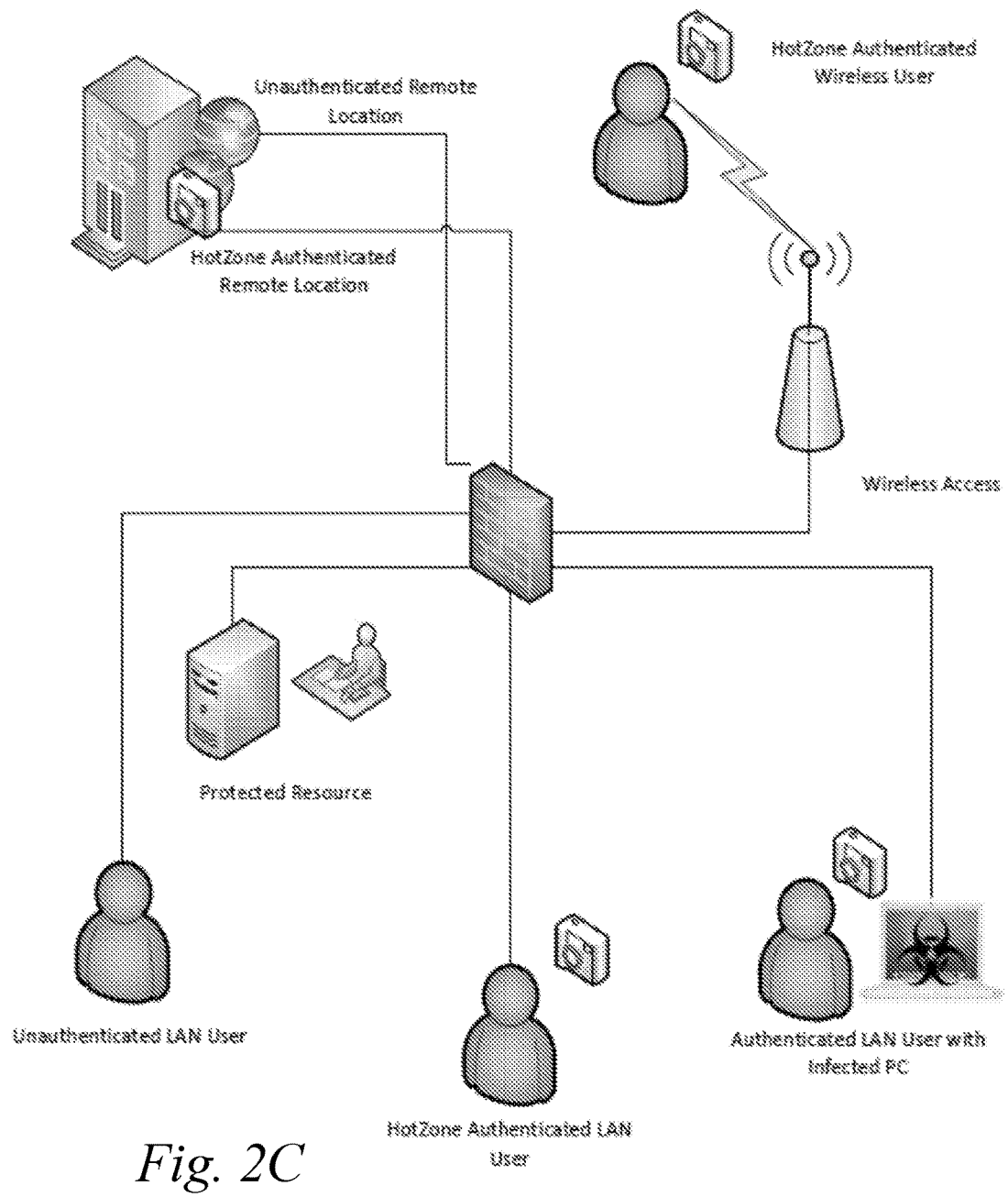
FIG. 2C is a block diagram depicting another embodiment of a system for managing network activity using biometrics.

In certain embodiments, the system implements a biometric authenticating firewall, and enforces certain policies that allow human-only traffic. FIG. 2C depicts another embodiment of a system for managing network activity using biometrics. As shown, the biometric authenticating firewall can perform per user basis traffic control. The per user basis traffic control can apply to different types of connection request or traffic, for example, from authenticated or unauthenticated remote or local (LAN) locations, and wireless or wired connections. The system can track per-user activity and/or analyze a blockchain audit trail to verify that a certain network traffic/activity can be attributed to the same user, and can enforce non-repudiation.

The per-user granular access can allow authenticated power users to be given full or a high level of access. For example, a power user may be a user justified in accessing certain protected resources or accessing a resource in an otherwise disallowed or restricted manner, due to the user's role and/or responsibilities. For example, a network security professional may be granted access to stress-test a network via activities that are otherwise considered malicious. The network security professional or a user with adequate security clearance may be permitted to operate from an infected and/or improperly-configured client device, for example. A standard user that is authenticated may be given limited access, e.g., access to resources that the user needs corresponding to the user's role or responsibilities. In certain embodiments, all other types of traffic may be denied.

By way of further examples, an authenticated user may have access to or see a network such as a VLAN. An unauthenticated user may not be able to access or see the VLAN as the authenticated user is able to. For example, access to certain VLAN resources (or logical areas of the VLAN) may be blocked or not visible to the unauthenticated user, even though both the unauthenticated user and authenticated user have access to the VLAN. Embodiments of the present systems and methods can effectively partition a VLAN with various levels of resources available to different users based on each specific user's assigned level of access. In some embodiments, both unauthenticated user and authenticated user can have access (e.g., the same level of access) to another network, such as the Internet. In certain embodiments, the authenticated user can see or be aware of an unauthenticated user's presence in a network, but the unauthenticated user may have no ability to detect the presence of an authenticated user in the network.

In some embodiments, the system performs per-user monitoring and tracking, and can establish a derivation history of a data product or communication back to a specific user. For instance, the system can track a series of transactions/communications attributable to a specific user, to establish provenance of a latest network activity to the same user. The system may establish or leverage on certified identity sources (e.g., trusted database of transactions specific to the user, which may be linked to the user's biometrics) and/or metadata, for example to attribute certain activity to a user and/or to include additional authentication means for the user that have been verified. The system can perform real time, ongoing and/or dynamic monitoring and verification of a user's activities and/or authentication state, using biometric and/or non-biometric authentication.

In some embodiments, the server 106 comprises a biometric-based security appliance. The security appliance may provide a firewall (or user-specific firewall policies) that separates an internal network (and its associated VLANs and logical zones) from one or more other networks such as the Internet. The firewall may be configured to allow/disallow network traffic based on the identity of the user generating the traffic. In cases where network traffic is not associated with a valid identity—as in the case of Malware and other potentially unwanted programs, an explicit-deny policy may be in place to prevent this traffic from propagating. The server may include a behavior based decision tree or process to determine whether to require re-authentication for unknown or unusual network traffic. The server may be in communication with, or interoperate with a biometric device 222 to determine the identity of a user.

In some embodiments, a system using biometrics to validate identity, providing individual authentication-based firewall rules, and using advanced heuristics, can for example positively identify a user based on a physically unclonable biometric signature, rely on the advanced heuristics to detect anomalies in human-behavior that generates network traffic, and re-validate the user when necessary. In contrast, conventional authenticating firewalls may have no protection against a compromised user account. Conventional methods may inefficiently watch machine-behavior to try to detect potentially harmful actions. For example, generally, heuristic detection of network attack patterns may rely on the assumption that malware or other malicious programs interact with the Operating System (OS) in predictable patterns of malicious behavior, e.g., modifying the registry, hooking or subclassing applications, subverting protection mechanisms, etc. The disadvantage of such an approach is that it lacks the flexibility to respond to new or unrecognized attack vectors and objectives such as data-mining attacks, Advanced Persistent Threats (APT) for "low and slow" data exfiltration, etc. Instead of using AI heuristics to watch for potentially malicious machine behavior, the present system can use AI heuristics to monitor deviations from known-good human-originated behavior.

The system can distinguish between human originated traffic by using biometric authentication to validate identity. When a deviation from learned "normal" behavior (for that specific user) is detected—the system is able to interact with the user to determine their identity, liveness and/or whether the generated traffic is intentional or not. Thus, the system not only validates that "a person" originated the anomalous traffic, but it also validates the identity of "a specific person" and determines if that individual is authorized to generate said traffic. In the absence of such a system, there is no convenient way to detect a situation where one valid and authenticated user walks away from their workstation while failing to log out, and another person takes control. This system can detect behavioral changes and validates the behavior against a specific user. Even in situations where a password is stolen, the system can prevent malicious non-attributable activity.

Some embodiments of the present system is also extensible and granular, for example, without resorting to segregated VLANs that can limit legitimate access. The system can be used to efficiently protect various security zones (e.g., partitioned by function/role, such as production, development, finance, etc.), as well as types of security zone (e.g., wireless or connected, local or remote access), within an organization from access.

In certain embodiments, the system may employ one or more unique methods for determining liveness and/or identity. Such methods can detect discrete biometric attributes that are difficult to replicate or reproduce using physical or electromechanical means, and/or are tied to a specific user's identity that cannot be consciously reproduced by another separate individual. For example, the system may process information on micro-saccade eye movements that are unique to each individual, e.g., that are not under conscious control. Micro-saccade movements (very small movements of the eye that keep the eye's photoreceptors from bleaching-out in order to maintain image consistency) tend to have anomalies that are specific to each individual. Aspects such as deflection distance, angle of deflection, duration, and frequency of displacements vary from person to person. Even if information collected by the system on Micro-saccade movements may not be diverse enough to create a complete biometric signature that contains the necessary diversity, it can at least add an element to the verification process that is difficult to replicate through electromechanical or other counterfeit means. Thus, it provides a secondary layer of defense against spoofing techniques. This technique can help mitigate situations where the "incorrect" person has the "correct" eye (an example of this would be a natural collision between two iris templates, or an intentional subversion through the use of specialized contact lenses). In this situation, the individual would not be able to consciously replicate the micro-saccade movements of the true user. Here, we have an advantage that liveness can be linked to a specific identity.

In another aspect, pupil dilation ratios are also unique to each individual. Pupil dilation ratios are characteristic to a person and not a result of conscious control. Pupil dilation ratios are difficult to replicate, electromechanically or otherwise. It has also been observed in our labs that the ratio of pupil dilation to ambient light is unique to each individual (within an acceptable range). For instance; two people can be in the same room, under the same light conditions, and their pupils dilate to a different relative degree. This observation provides support that pupil dilation ratios can be another factor of liveness, linked to a specific identity.

Figure 2D:
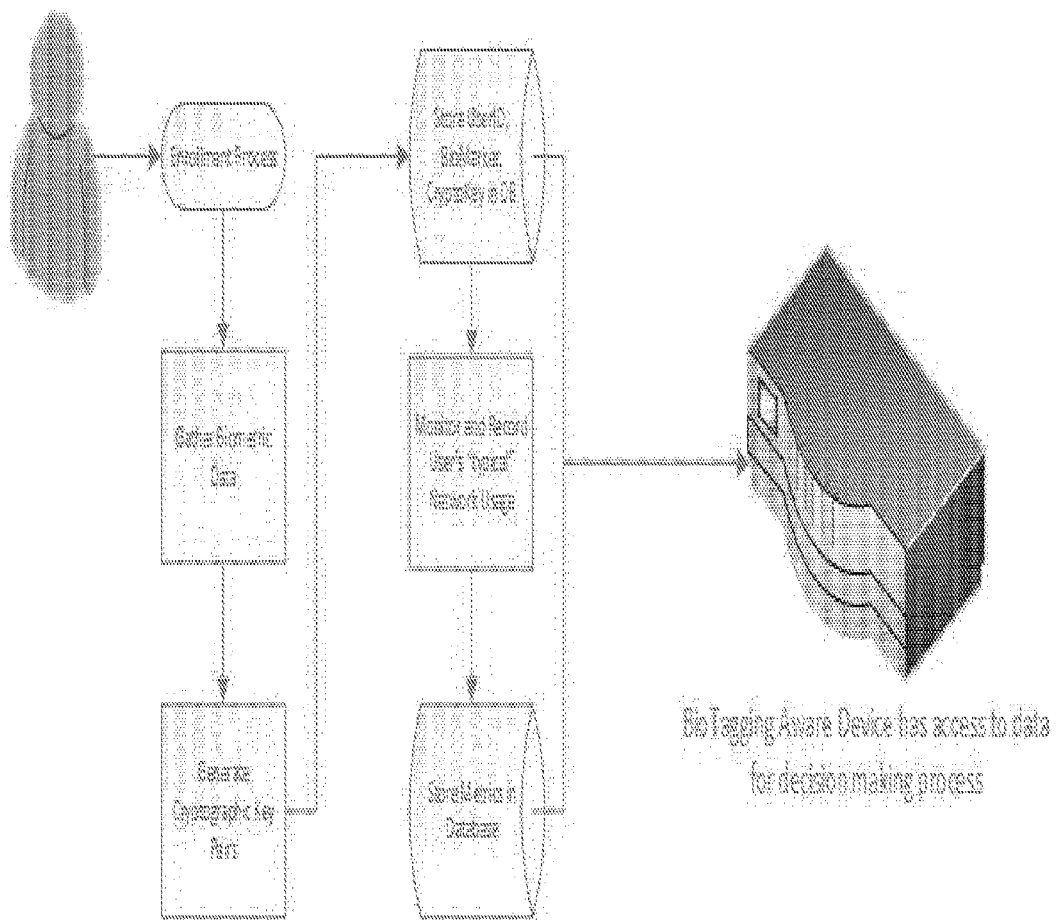
FIG. 2D is a flow diagram depicting one aspect of an embodiment of a method for managing network activity using biometrics.

Referring now to FIG. 2D, on embodiment of an aspect of a method for managing network traffic using biometrics is depicted. The method performs enrollment of one or more users, using a biometric device 222 for example. After enrollment and during a training/learning phase, the system may capture or record a user's network traffic profile via a traffic monitor 221 for example. The system may capture biometric markers of a user via a biometric device 222, for example in connection with the recorded traffic. For example, the system may request biometric authentication and/or liveness verification as the system encounters a new traffic scenario, and may include the biometric authentication and/or liveness verification in the system's database of learned scenarios. The learning/training process may incorporate the use of neural network analysis on the captured biometric markers and/or user network traffic, to establish learned patterns and scenarios for storing in the database 250, sometimes referred to as the BioTag database.

In some embodiments, the biometric device 222 is configured to acquire one or more eye-based biometric markers and/or characteristics during enrollment and/or training. The biometric device 222 may be configured to synergistically acquire and/or process the eye-based information (in parallel for example) to more efficiently establish liveness and/or identity of a user. For example, the biometric device may be designed and built for detecting inherent features of the iris of the human eye to be used as unique markers for authentication. The biometric device may be designed and built for detecting micro-saccade movements of the human eye. In certain embodiments, the biometric device may be designed and built for comparing the movements to a database of registered users by utilizing either artificial intelligence (AI) based algorithms or a distance metric (e.g., Hamming Distance, Levinshtein Distance, etc.). The biometric device may be designed and built for detecting the ratio(s) of pupil dilation to the luminosity of ambient light or changes in the luminosity. The biometric device may be designed and built for comparing the detected ratio(s) to a database of registered users by utilizing either AI based algorithms or a distance metric (e.g., Hamming Distance, Levinshtein Distance, etc.).

In certain embodiments, the traffic monitor 221 of the system monitors and learns from a user's internet and/or network behavior while positively tying known-good traffic to a physically unclonable biometric marker. This approach ensures that baseline data is collected from a known-live, and authenticated source. The traffic monitor 221 may utilize advanced machine learning techniques such as Feed Forward Back Propagation Neural Networks (FFBPNN), Bayesian Analysis, and Artificial Intelligence algorithms, or some combination thereof. The traffic monitor 221 may, for example, incorporate an AI/machine learning algorithm capable of learning network use patterns, e.g., through a combination of FFBPNN and Bayesian Analysis. This process is operational on a firewall that is capable of per-user rule application. During a learning' phase, it may be assumed that the network is in safe and reliable state. The traffic monitor 221 may record traffic patterns (e.g., in the database 250) on a per user basis with requests for biometric authentication to validate identity. The server may validate liveness using an AI routine that validates discrete metrics such as micro-saccade movements and/or pupil dilation ratio.

Figure 2E:
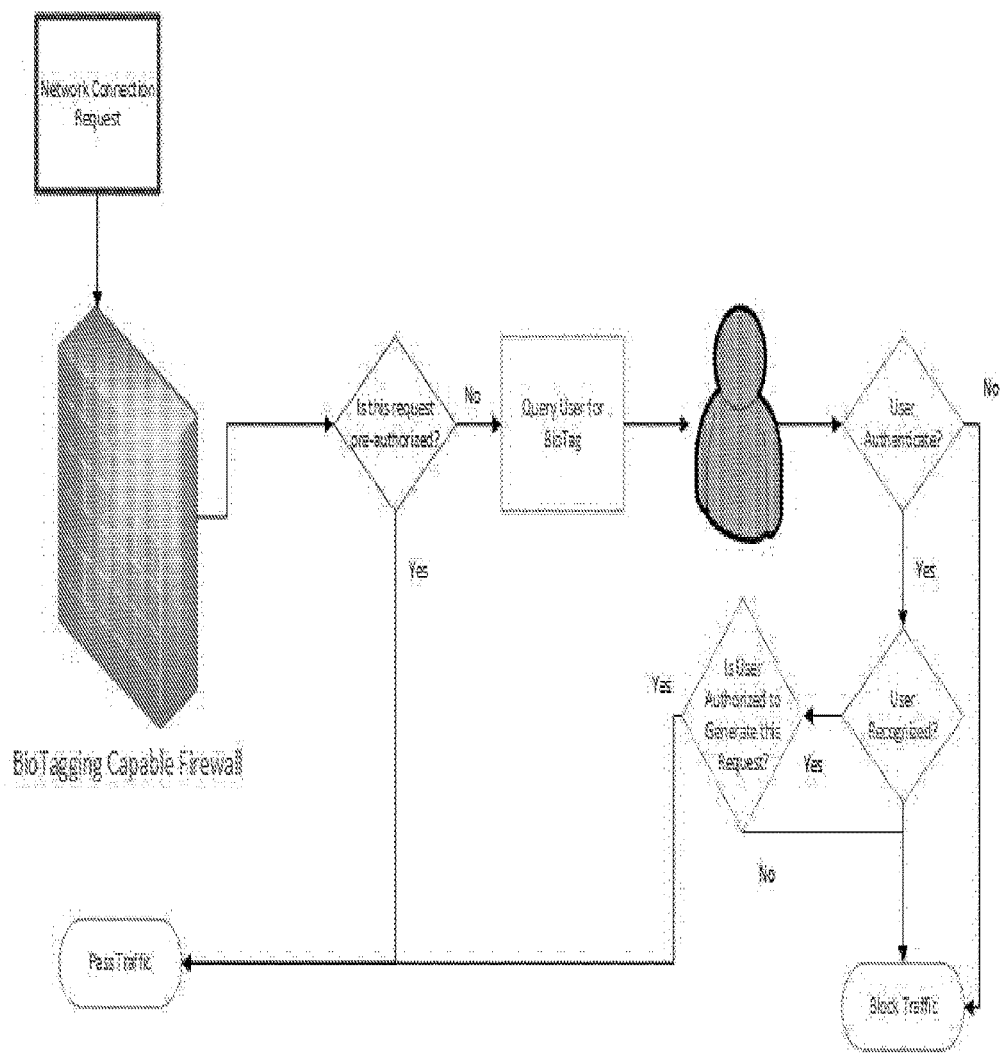
FIG. 2E is a flow diagram depicting another aspect of an embodiment of a method for managing network activity using biometrics.

Referring now to FIG. 2E, one embodiment of another aspect of a method for managing network activity using biometrics is depicted. The system can perform traffic monitoring after an initial per-user training or learning period. After the individualized training or learning period, whenever an anomalous network connection is initiated that falls outside of the learned parameters, the system can inform the user and ask the user to biometrically authenticate the corresponding connection if it is an intended action. The traffic monitor 221 can conduct an ongoing Turing test against all network traffic. Any anomalous network behavior that exceeds a user-defined threshold can be detected by the traffic monitor 221 and can trigger a biometric validation request to positively identify the source of the behavior; machine or human. Additionally, the traffic monitor 221 may tie or associate the traffic to a specific identity that has strong elements of non-repudiation. Biometric authentication/re-authentication along with liveness detection prevents malware from simulating an authentication. Connections can then be allowed or denied by the server based on user interaction. Once a new connection is authenticated, it is then "learned" by the AI system of the server to allow such a connection to proceed in the future without user interaction (e.g., as long as that connection continues to conform to the behavioral attributes detected).

This approach can be completely customized on a per-individual basis. For instance; it is generally accepted that any application that launches a network-based attack, or in some other way tries to subvert the security of a system should be classified as hostile and disallowed. However, there are some individuals whose primary legitimate responsibility is to conduct network attacks—as in the case of penetration testers or other security professionals. Rather than deem this behavior as malicious and attempt to block the traffic based on application-level heuristics, the traffic monitor 221 can learn the behavior of an individual and allow or deny it based on behavior that it is coming from an authorized and live user. The traffic monitor 221 can allow or prohibit certain behavior on a per-user-basis, based on rules or policies determined for the specific user. The traffic monitor can apply firewall policies that follows a user from resource to resource (e.g., between client devices and/or networks). The firewall policies follow the corresponding living-identity and make decisions based on known behavioral metrics to permit or deny network traffic.

In some embodiments, the present methods and systems utilizes a zero knowledge proof configuration or solution. For instance, between two network entities such a server and a client, the client may be able to prove to the server that the client possesses information (e.g., biometrics of a user) sufficient to authenticate the client (or the user) and/or prove human-origination, without having to show or provide the information to the server.

Figure 2F:
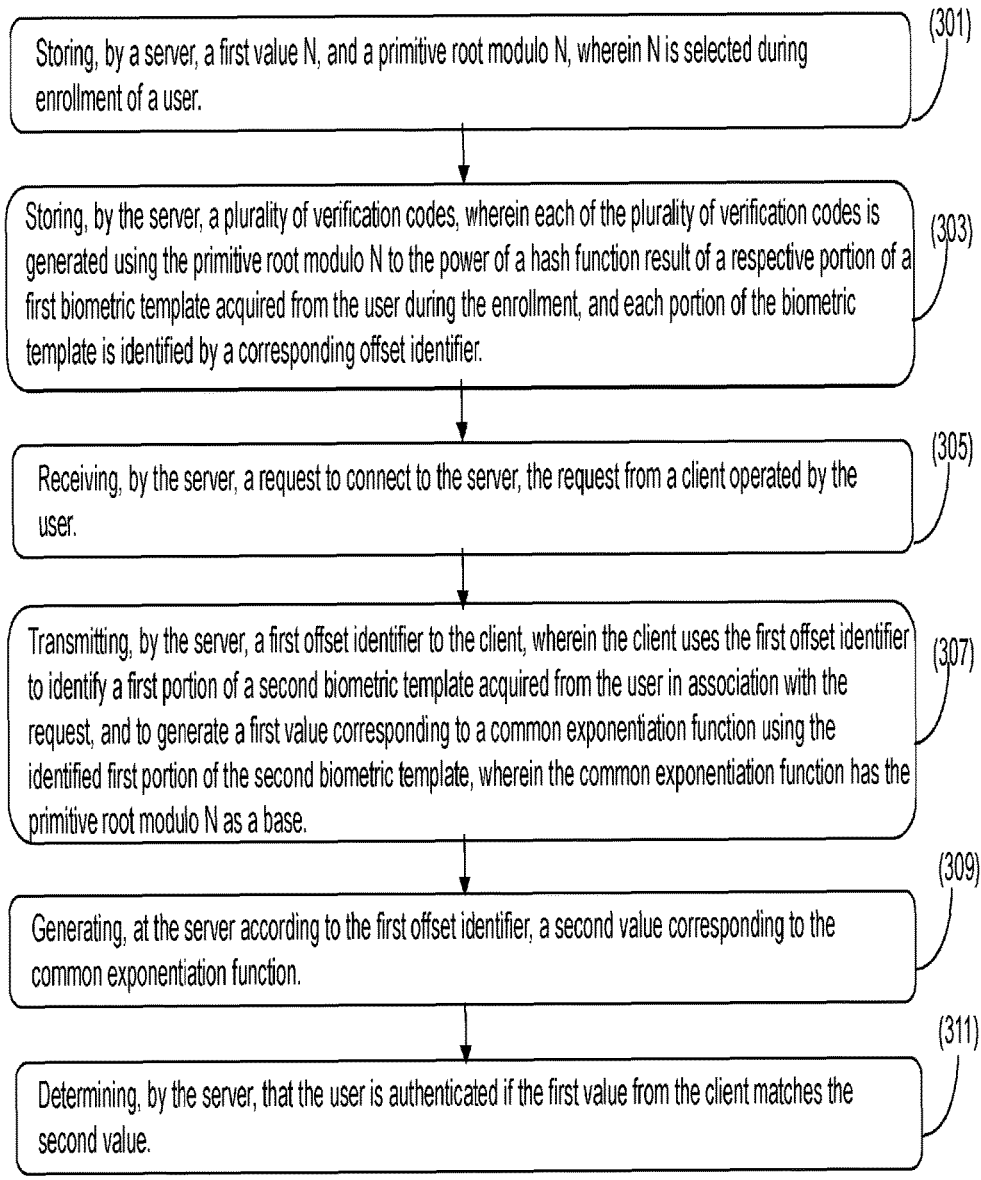
FIG. 2F is a flow diagram depicting one embodiment of a method for managing network activity using biometrics.

Referring now to FIG. 2F, one embodiment of a method for managing network traffic using biometrics is depicted. The method may include storing, by a server, a first value N, and a primitive root modulo N, wherein N is selected during enrollment of a user (301). The server may be configured to store a plurality of verification codes (303). Each of the plurality of verification codes may be generated using the primitive root modulo N to the power of a hash function result of a respective portion of a first biometric template acquired from the user during the enrollment. Each portion of the biometric template may be identified by a corresponding offset identifier. The server may receive a request to connect to the server, from a client operated by the user (305). The server may transmit a first offset identifier to the client (307). The client may use the first offset identifier to identify a first portion of a second biometric template acquired from the user in association with the request, and to generate a first value corresponding to a common exponentiation function using the identified first portion of the second biometric template. The common exponentiation function may have the primitive root modulo N as a base. The server may generate, according to the first offset identifier, a second value corresponding to the common exponentiation function (309). The server may determine that the user is authenticated if the first value from the client matches the second value (311).

In some embodiments, an enrollment process collects biometric information from a user, and stores associated information for later use in authenticating or verifying a network traffic purportedly originating from the user. The enrollment process may be performed by one or more computing devices, which may include a biometric acquisition device for instance.

Referring now to 301, and in some embodiments, a server may store a first value N, and a primitive root modulo N, wherein N is selected during enrollment of a user. The first value N may comprise one of a prime number, a discrete logarithm element, or an elliptic curve element, as examples. The first value N may comprise a large number. In some implementations, the large number may be generated with properties such that when mathematically treated with another large number it is difficult to reverse the operation to determine the numbers involved.

The measure of cryptographic security is based on number theory, and all integer numbers except for 0 and 1 are composed of prime numbers. Some important cryptographic algorithms such as Rivest-Shamir-Adleman (RSA) depend on the fact that prime number factorization of large numbers takes a long time. In the RSA method, a "public key" is generated that consists of the product of two large prime numbers used to encrypt a message. A "secret key" consisting of the two large prime numbers is used to decrypt the secret message. This is known as asymmetric cryptography because the key used to encrypt the message is not the same as the key used to decrypt the message. It is computationally infeasible to derive the two prime numbers used to factor the public key from the just the knowledge of the public key.

Another related number group belongs to the set known as discrete logarithms. In mathematics, a discrete logarithm in an integer (k) solving for the equation $b^k==g$, where b and g are elements of a finite group. Discrete logarithms solve the same equation for real numbers b and g, where b is the base of the logarithm and g is the value whose logarithm is being derived. It is important to note that there exists no general method for computing the absolute products of two prime numbers or for computing discrete logarithms and that these problems have no efficient solution.

In some embodiments, the primitive root modulo N that is stored is generated to establish a ring-sequence of numbers that cycle-through at a specific (N) iterator. This number may be referred as (g). In modular arithmetic, a number (g) is a primitive root modulo N if every number (a) coprime to (N) is congruent to a power of g modulo N. In other words, for every integer (a) coprime to (N) there is an integer (k) such that $g^k \equiv a \pmod{N}$.

For example; if N is a positive integer, the numbers between 1 and (N−1) that are coprime to (N) form a group with multiplication modulo N as the operation. This is called the group of units modulo N or the group of primitive classes modulo N. This group is cyclic if and only if N is equal to 2, 4, $p^k$, or $2p^k$ where $p^k$ is a power of an odd prime number.

As an example, primitive root modulo n is used in the Diffie-Hellman key exchange protocol.

In some embodiments, the first value N and the primitive root modulo N are used to compute a cryptographic generator function which is the multiplicative group of integers modulo N.

In certain embodiments, a user presents a biometric factor (e.g., Iris, fingerprint, face, voice) to a biometric acquisition device during enrollment. A goal of the enrollment process, in the context of this disclosure, is to generate a string of information (or secrets) that can only be generated in the presence of a biometric factor, in one or more embodiments. A biometric factor, as used herein may refer to any physical biological feature(s) that are unique to an individual and has a negligible collision-rate with any other biometric factors in another individual. For example, it is known that biometric factors such as the patterns found in the human iris, fingerprint, facial-features, and voice have an inherent uniqueness such that one set of biometric factors (markers) can be distinguished from a set derived from another individual with a high degree of confidence to an associated identity.

While the BioTag protocol or methods described herein are neither vendor nor method specific, it should be noted that biometric acquisition methods that demonstrate a higher degree of detail and a low incidence of biometric marker collision may be preferred. Regardless of the biometric factors acquired, the enrollment process may output a string of binary values (or other representation) of a given length that is presumed to be relatively unique to the individual. In the BioTag protocol, this output may be referred to as 'raw biometric'.

It should be noted here that re-acquisition of biometric samples do not always yield the exact same results as the initial acquisition. This may for example be due to various artifacts introduced into the initial enrollment phase when compared to various artifacts in the re-acquisition phase. For example, in the case of fingerprint acquisition, various irregularities in the pressure, humidity, and/or foreign particles may yield a slightly different result on comparison with an original sample.

To overcome these anomalies, and in some embodiments, a biometric device may utilize an algorithm that account for subtle differences between the original sample and any subsequent authentication samples. At least two solutions for handling this anomaly are addressed herein, e.g., in the description relating to a verification process (after the enrollment process).

In some embodiments, a biometric acquisition device involved in the enrollment process generates a string of bytes based on the biometric markers present in a person's biometric factor.

As addressed above, the result of the biometric acquisition may include a string of bytes (B) that has a direct correlation to the biometric markers present in the person's enrollment factor (i.e. iris pattern, fingerprint, face, voice). The result of the biometric acquisition may be referred to as a biometric template. It may be required that the output of the biometric acquisition device has enough detail to positively identify one individual from another within a reasonable tolerance, sometimes referred to or known as the False Acceptance Rate (FAR).

In some embodiments, for each portion (e.g., or resultant byte) of the biometric template, or 'marker' in the biometric factor, a random number sometimes known as a 'salt' (s) may be generated, and may be appended to the marker creating an 'extended-marker'. In cryptography, a salt is random data that may be used as an additional input to a one-way function that "hashes" a secret value. The primary function of salts is to defend against modern cryptanalysis attacks. Salts may be used to combat the use of rainbow tables for cracking secrets. A rainbow table is a large list of pre-computed hashes for commonly used values. For a rainbow table to be effective at cracking a secret stored with a salt value, the rainbow table would have to contain a hashed value of the secret concatenated with every possible salt value, which is infeasible with current technology and storage capacity.

Adding a salted value to a secret can also make dictionary attacks and/or brute force attacks against multiple secrets much slower. This may not necessarily be true for one value (e.g., one biometric marker) which is why the BioTag protocol specifies multiple verification codes for each biometric template, in some embodiments. Another benefit of adding a salted value to each biometric marker is that two users may share one or more biometric markers in a string of markers. Adding a unique salt to each user's biometric markers can ensure that even if two users share a common marker (trait), an attacker would not be able to derive this information from a compromised database.

In some embodiments, a one-way hash function is applied to each extended marker. For each byte (B) a hash (H) is generated such that the result (x)=the hash of the salt (s) concatenated with (B) byte. For example, $$x_1=H(s1,B_1) \ldots x_2=H(s2,B_2) \ldots x_3=H(s3,B_3) \ldots \ldots x_{256}=H(s^{256},B_{256})$$

A hash function may be any mathematic function that can be used to map data of an arbitrary size to data of a fixed size. One use of a hash function is to create a data structure called a hash table. In cryptography, a hash function can allow one to easily verify that some input data maps to a given hash value, but if the input data is unknown, it may be computationally impossible, in polynomial time, to reconstruct the data from the hash value. This is the basis of many authentication mechanisms.

Hash procedures or functions are deterministic—meaning that for a given input value, each hash function always generate the same hash value. A good hash function should map the expected inputs as evenly as possible over its output range. In other words, every hash value in the output range should be generated with the same probability to reduce potential collisions. Hash procedures should be non-invertible, meaning that it is not realistic to reconstruct the input data from its hash value alone without spending great amounts of computing resources.

In one embodiment of the BioTag protocol or methods, a rolling-hash may be employed to accommodate for the aberrations found in biometric samples from the same individual biometric markers. This can eliminate the need to have a 1:1 relationship on a byte-for-byte match between two biometric factor samples from the same individual. In another embodiment, a universal hashing algorithm (such as MD5, SHA, or SHA-1) may be employed presuming that a biometric match can release a previously stored biometric sample that has a 1:1 relationship with a tokenized biometric sample stored on a server. This disclosure may not dictate the exact hashing algorithm that shall be utilized by the implementer, as it may be dependent upon the exact requirements of the application.

Referring to (303) and in some embodiments, the server may be configured to store a plurality of verification codes. Each of the plurality of verification codes may be generated using the primitive root modulo N to the power of a hash function result of a respective portion of a first biometric template acquired from the user during the enrollment. Each respective portion of the first biometric template may comprise a respective biometric marker. The hash function result may comprise a has function result of a respective portion/byte of a first biometric template concatenated or combined with a respective salt, for instance. Each portion of the biometric template may be identified by a corresponding offset identifier.

In some embodiments, a verification code is created for each hashed value of a respective biometric marker concatenated with a respective salt. Each of the plurality of verification codes (v) may be generated using the primitive root modulo N (g) to the power of a hash function result of a respective value, for example. For instance, $$v_1 = g^x{}_1 \ldots v_2 = g^x{}_2 \ldots v_3 = g^x{}_3 \ldots \ldots v_{256} = g^x{}_{256}$$

The respective value may be generated using a random number (or salt) and a respective portion of the first biometric template acquired from the user during the enrollment. The random number may comprise one of: a random number separate from random numbers used to generate other respective values, or comprises a common random number used to generate other respective values. In other words, in some embodiments, a different/separate salt is adopted to generate each different extended biometric marker, while in other embodiments, the same common salt may be used for generating all extended markers that are to be subject to hash functions.

In certain embodiments, a verification code completely abstracts a user's biometric marker(s) to the point where, even if the verification codes were publically disclosed, an attacker would not be able to reconstruct the biometric markers used to construct the codes. Additionally, the addition of the salt and the resulting primitive root modulo N for example, may ensure that if an attacker were to acquire the raw biometric of an authenticated user, the attacker would be unable to reconstruct the verification codes. This aspect may be unique to at least some embodiments of the presently disclosed methods and systems.

In certain embodiments, the verification code is generated by obtaining the result of taking the primitive root to the exponent (N) {e.g., a large number described above} for each of the extended biometric markers. For example, and in some embodiments, a verification code is generated as the primitive root modulo N to the power of a hash function result of a respective byte of a first biometric template concatenated or combined with a respective salt.

In one or more embodiments, the enrollment process transmits and/or stores one or more of the following values to the server which the client expects to biometrically authenticate with in future sessions:

a. A unique user ID (u, e.g., Username or other unique verifier).

b. The large number or first value (N)

c. The primitive root modulo N (g)

d. The random salt (s) for each extended biometric marker.

e. The verification codes ($V_{1 \ldots 256}$) which are derived as described above.

The server may store the above information in the most appropriate way as determined by the integrator. This may comprise using a database or memory of some sort.

Referring to (305) and in some embodiments, the server may receive a request to connect to the server (or to access a resource of the server or via the server), from a client operated by the user. The client may be pre-enrolled, and may attempt to connect to the server and to validate the identity of the user. The client may send an identifier (u) associated with the user to the server. The server and client may engage in a verification process to authenticate the user, e.g., to verify that the request is human-originated. In some embodiments, the server receives an identifier of the user in the request. This identifier may sometimes be referred to as a user identifier (ID).

The user ID may comprise any number of unique identifiers used to distinguish one user from another. By way of illustration only, and not intended to be limiting in any way, the user ID may comprise a user name or a driver's license number.

In some embodiments of the methods disclosed herein, if authentication is to take place over raw TCP/IP or using raw TCP/IP without reference to a particular resource, the user ID could comprise a unique byte or series of bytes within an IP header for example. In this case, the server may proceed with the identification steps outlined below to authenticate the user to access various resources or to track, alert and/or log specific user activity.

The server may generate a random number (r) to be used as an offset into the verification codes table, and may fetch that verification code along with the predetermined salt. As noted in the enrollment stage, a series of verification codes may be generated during the enrollment phase. The server can for instance access one random stored verification code along with the verification code's associated salt value for authenticating the client.

The random number may be a number between 1 and 256. For instance, the server may select a first offset identifier (or the random number) responsive to receiving the request. The server may retrieve a first portion of the biometric template stored by the server according to the identifier of the user and the first offset identifier. In some embodiments, the server may access the biometric template associated with the user and stored by the server, according to the identifier of the user. The server may access the salt or random number corresponding to the first portion of the biometric template being retrieved.

Referring to (307) and in some embodiments, the server may transmit the first offset identifier to the client. The server may transmit the first offset identifier to the client, but does not send a corresponding salt to the server. In one simple embodiment, a random offset (e.g., first offset identifier) sent to the client can point to a byte in the biometric template (e.g., second biometric template) acquired at the client side, which may comprise an unmodified biometric table in some embodiments. By way of a non-limiting example, the client may be issued a random offset of '6' and the biometric table (either statically stored or acquired in real-time) may in one embodiment be represented as:

TABLE 1

| Biometric Table | | | | | | | | | |
|---|---|---|---|---|---|---|---|---|---|
| 0A | 9B | F1 | 0C | DD | 04 | 90 | 16 | 9F | 2C |
| Offset 0 | Offset 1 | Offset 2 | Offset 3 | Offset 4 | Offset 5 | Offset 6 | Offset 7 | Offset 8 | Offset 9 |

In the example discussed above, the client would access byte 6, which contains the hexadecimal value 0x90.

The user may for instance present a biometric factor to a biometric device (e.g., the client), which acquires the second biometric template in association with the request. The biometric device may generate (B) as in the enrollment process. Alternatively, a biometric may be presented to the biometric device that uses the presence or absence of biometric markers to either allow access or deny access in comparison or matching against a stored biometric template.

In some embodiments, the client generates a long term private key (x) for the client using the first offset identifier (r). The client may use the first offset identifier to identify or access a first portion of the second biometric template acquired from the user in association with the request, and computes the client's long-term private key (x) using the first offset identifier (r) supplied by the server.

In some embodiments, the client selects and/or uses a random number (a) to generate a short term public key for the client. The short term public key may comprise, or be generated by computing the primitive root modulo N to the power of the random number (a). For instance, the client may generate a random number (a) that is greater than 1 and less than the large number (N). The client may generate a temporary public key (C-$K_{pub}$) by computing A=$g^a$, and may send the temporary public key to the server. The server may generate a random parameter, and may send the random parameter to the client for use in generating the first value corresponding to the common exponentiation function.

The server may select or generate a random number (b), and may compute a short term public key for the server, the public key comprising the sum of: the primitive root modulo N to the power of b, and a first verification code from the plurality of verification codes that corresponds to the first offset identifier. The server's short term public key (Z) may be generated by computing the value of the verification code obtained using the first offset identifier, concatenated with the primitive root modulo N to the power of the random number (b). The temporary public key may be expressed or computed as $$Z=V_r+g^b$$

In some embodiments, the server generates the random number (b) that is greater than 1 and less than the large number N. In certain embodiments, the server generates the temporary public key (Z or S-$K_{pub}$) and sends it, along with a random parameter (u) to the client. The server may send the temporary public key for the server to the client for use in generating the first value corresponding to the common exponentiation function. The common (ab+bux) exponentiation function may be expressed as: S=$g^{(ab+bux)}$ Referring to (309) and in some embodiments, the server may generate, according to the first offset identifier, a second value corresponding to the common exponentiation function. S is sometimes referred to as a session key or shared session key. Both the client and server may generate the shared session key (S) based on the common exponentiation function. Because of the transitive properties of the formula S=$g^{(ab+bux)}$, it can be expanded into the following formulas in some embodiments:

on the client side, the session key can be derived by subtracting the primitive root modulo N, raised to the hash of the salt concatenated with the value at the offset, raised to the client's temporary private key plus the server's temporary value multiplied by the hash of the salt concatenated with the value at the offset:

$$S=(Z-g^x)^{(a+ux)}$$

on the server side, the session key can be derived by multiplying the client's public key with the verification code value at the offset raised to the random nonce u, raised to the power of the server's private key:

$$S=(A*v^u)^b$$

Thus, each side can compute the shared session key based on the information they have. As mentioned above, a relationship exists between these session key values due to the transitive nature of the common exponentiation function such that the shared session key is really equal to the primitive root modulo N raised to the product of the server's private key and the client's private key, added to the product of the server's private key and the server's random nonce u, and the hash of the salt concatenated with the value of the offset at the biometric marker. i.e. S=$g^{(ab+bux)}$ Referring to (311) and in some embodiments, the server may determine that the user is authenticated if the first value from the client matches the second value. If the client's biometric marker, identified using the first offset identifier matches the marker originally used to generate the verification code for that offset, the session keys shall match and the user has successfully authenticated.

Verification that a biometric sample is achieved above without ever transmitting any actual biometric data. However, the rest of the data remains unencrypted. If data encryption is also desired, the result of the previous stage (S) may be used as a symmetric encryption key (K) as follows:
a. A one-way hash function is applied to (S)
b. A modifier may be applied to the result to extend the length (optional)
c. The result K can be used in any symmetric encryption algorithm such as AES to encrypt the channel.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of managing digital communications using biometrics, the method comprising:
    identifying, by a first device, a first value N, and a cryptographic primitive modulo N, wherein N is determined during enrollment of a user;
    storing, by the first device, one or more verification codes, wherein each of the one or more verification codes is generated using the cryptographic primitive modulo N to the power of a one-way function result of a respective portion of a first biometric template acquired from the user during the enrollment, and each portion of the biometric template is identified by a corresponding identifier;

receiving, by the first device, a request to connect to the first device, the request from a second device operated by the user;

transmitting, by the first device, a first identifier to the second device, wherein the second device uses the first identifier to identify a first portion of a second biometric template acquired from the user in association with the request, and to generate a first value using the identified first portion of the second biometric template; and determining, by the first device, that the user is authenticated when the first value from the second device matches a second value generated at the first device according to the first identifier.

2. The method of claim 1, wherein the first value N comprises one of a prime number, a discrete logarithm element, or an elliptic curve element.

3. The method of claim 1, wherein each of the one or more verification codes is generated using the cryptographic primitive modulo N to the power of a hash function result of a respective value, the respective value generated using a random number and a respective portion of the first biometric template acquired from the user during the enrollment.

4. The method of claim 3, wherein the random number comprises one of: a random number separate from random numbers used to generate other respective values, or comprises a common random number used to generate other respective values.

5. The method of claim 1, further comprising receiving, by the first device, an identifier of the user in the request, and retrieving a first portion of the biometric template stored by the first device according to the identifier of the user and the first identifier.

6. The method of claim 1, further comprising generating, by the first device, a random number z and computing a public key for the first device as comprising the sum of: the cryptographic primitive modulo N to the power of z, and a first verification code from the one or more verification codes that corresponds to the first identifier.

7. The method of claim 1, further comprising sending, by the first device, the public key for the first device to the second device for use in generating the first value.

8. The method of claim 1, further comprising generating, by the first device, a random parameter, and sending the random parameter to the second device for use in generating the first value.

9. The method of claim 1, wherein the second device generates a long term private key for the second device using the first identifier.

10. The method of claim 1, wherein the second device uses a random number y to generate a short term public key for the second device, the short term public key comprising the cryptographic primitive modulo N to the power of y.

11. A system of managing digital communications using biometrics, the system comprising:
   a first device in communication with a second device operated by a user, the first device configured to identify a first value N, and a cryptographic primitive modulo N, wherein N is selected during enrollment of the user, the first device comprising:
      memory configured to store one or more verification codes, wherein each of the one or more verification codes is generated using the cryptographic primitive modulo N to the power of a one-way function result of a respective portion of a first biometric template acquired from the user during the enrollment, and each portion of the biometric template is identified by a corresponding identifier;
      a transceiver configured to receive a request from the second device to connect to the first device, and to transmit a first identifier to the second device, wherein the second device uses the first identifier to identify a first portion of a second biometric template acquired from the user in association with the request, and to generate a first value using the identified first portion of the second biometric template; and
      one or more processors configured to determine that the user is authenticated when the first value from the second device matches a second value generated at the first device according to the first identifier.

12. The system of claim 11, wherein the first value N comprises one of a prime number, a discrete logarithm element, or an elliptic curve element.

13. The system of claim 11, wherein each of the one or more verification codes is generated using a cryptographic primitive modulo N to the power of a one-way function result of a respective value, the respective value generated using a random number and a respective portion of the first biometric template acquired from the user during the enrollment.

14. The system of claim 13, wherein the random number comprises one of: a random number separate from random numbers used to generate other respective values, or comprises a common random number used to generate other respective values.

15. The system of claim 11, wherein the transceiver is further configured to receive an identifier of the user in the request, and the one or more processors is further configured to retrieve a first portion of the biometric template stored by the first device according to the identifier of the user and the first identifier.

16. The system of claim 11, wherein the one or more processors is further configured to generate a random number z and to compute a public key for the first device as comprising the sum of: the cryptographic primitive modulo N to the power of z, and a first verification code from the one or more verification codes that corresponds to the first identifier.

17. The system of claim 11, wherein the transceiver is further configured to send the public key for the first device to the second device for use in generating the first value.

18. The system of claim 11, wherein the one or more processors is further configured to generate a random parameter, and the transceiver is further configured to send the random parameter to the second device for use in generating the first value.

19. The system of claim 11, wherein the second device generates a long term private key for the second device using the first identifier.

20. The system of claim 11, wherein the second device uses a random number y to generate a short term public key for the second device, the short term public key comprising the cryptographic primitive modulo N to the power of y.

* * * * *